(12) United States Patent
Yarvis et al.

(10) Patent No.: US 9,202,230 B2
(45) Date of Patent: Dec. 1, 2015

(54) TECHNIQUES FOR MONETIZING ANONYMIZED CONTEXT

(75) Inventors: Mark D. Yarvis, Portland, OR (US); Matthew D. Wood, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 12/754,643

(22) Filed: Apr. 6, 2010

(65) Prior Publication Data
US 2011/0246273 A1 Oct. 6, 2011

(51) Int. Cl.
G06Q 30/00 (2012.01)
G06Q 30/02 (2012.01)
G06F 21/10 (2013.01)
G06Q 30/06 (2012.01)

(52) U.S. Cl.
CPC ............ *G06Q 30/0236* (2013.01); *G06F 21/10* (2013.01); *G06Q 30/02* (2013.01); *G06Q 30/0217* (2013.01); *G06Q 30/0251* (2013.01); *G06Q 30/0615* (2013.01)

(58) Field of Classification Search
CPC .......... G06Q 30/0201; G06Q 30/0207; G06Q 30/0215; G06Q 30/0615; G06Q 30/02; G06Q 30/0217; G06Q 30/0236; G06Q 30/0255; G06Q 2220/00; G06Q 2220/10; G06F 21/10
USPC .............. 705/14.19, 7.29, 14.1, 14.17, 26.42, 705/7.11, 14.36, 14.53, 50–54, 14.49
See application file for complete search history.

(56) References Cited

U.S. PATENT DOCUMENTS

| | | | |
|---|---|---|---|
| 6,571,216 B1 * | 5/2003 | Garg et al. ................. | 705/14.25 |
| 6,865,545 B1 * | 3/2005 | Epstein et al. ............. | 705/14.26 |
| 7,222,102 B2 * | 5/2007 | Sato et al. ................. | 705/52 |
| 7,444,655 B2 * | 10/2008 | Sardera .................... | 725/9 |
| 7,630,986 B1 * | 12/2009 | Herz et al. ................ | 1/1 |
| 7,707,413 B2 * | 4/2010 | Lunt et al. ................. | 713/168 |
| 7,974,928 B2 * | 7/2011 | Heiden .................... | 705/64 |
| 8,055,536 B1 * | 11/2011 | Olaiya et al. .............. | 705/14.1 |
| 8,208,943 B2 | 6/2012 | Petersen et al. | |
| 2001/0034647 A1 * | 10/2001 | Marks et al. .............. | 705/14 |
| 2002/0026351 A1 * | 2/2002 | Coleman .................. | 705/14 |
| 2002/0143705 A1 | 10/2002 | Kaars | |
| 2003/0163416 A1 * | 8/2003 | Kitajima ................... | 705/39 |

(Continued)

FOREIGN PATENT DOCUMENTS

CN 1601429 A 3/2005
JP 2003-316965 A 11/2003

(Continued)

OTHER PUBLICATIONS

Office Action received for Chinese Patent Application No. 201110137572, mailed on Jul. 3, 2013, 16 pages of Office Action Including 9 page of English Translation.

(Continued)

*Primary Examiner* — Bennett Sigmond
(74) *Attorney, Agent, or Firm* — Sutherland Asbill & Brennan LLP (57) ABSTRACT

An embodiment of the present invention provides a method of offering anonymous incentive based context to service providers, comprising delivering context information of a user to the service provider, wherein prior to delivery of the context information to the service provider, the context is anonymized by removing identifying information and aggregating it with context from additional users.

12 Claims, 8 Drawing Sheets

(56) References Cited

U.S. PATENT DOCUMENTS

| | | | |
|---|---|---|---|
| 2004/0199789 A1* | 10/2004 | Shaw et al. | 713/201 |
| 2005/0025300 A1* | 2/2005 | Lagadec et al. | 379/201.11 |
| 2005/0076089 A1* | 4/2005 | Fonseca | 709/206 |
| 2007/0055482 A1* | 3/2007 | Goodermote et al. | 702/184 |
| 2007/0067297 A1* | 3/2007 | Kublickis | 707/9 |
| 2007/0106626 A1* | 5/2007 | Mundie et al. | 706/20 |
| 2007/0130070 A1* | 6/2007 | Williams | 705/50 |
| 2008/0015927 A1* | 1/2008 | Ramirez | 705/10 |
| 2009/0083118 A1* | 3/2009 | Kallery et al. | 705/10 |
| 2009/0138346 A1* | 5/2009 | Kalaboukis et al. | 705/14 |
| 2010/0115530 A1 | 5/2010 | Ahmad et al. | |
| 2010/0121696 A1* | 5/2010 | Green et al. | 705/14.13 |

FOREIGN PATENT DOCUMENTS

| | | |
|---|---|---|
| JP | 2008-097645 A | 4/2008 |
| JP | 2009053819 | 3/2009 |
| KR | 10-2009-0079116 A | 7/2009 |
| WO | 2011/126912 A2 | 10/2011 |
| WO | 2011/126912 A3 | 2/2012 |

OTHER PUBLICATIONS

PCT International Search Report (ISR) for International Application Serial No. PCT/US2011/030623 mailed Dec. 26, 2011.

Written Opinion (WO) of the International Searching Authority for International Application Serial No. PCT/US2011/030623 mailed Dec. 26, 2011.

International Preliminary Report on Patentability (IPRP) for International Application Serial No. PCT/US2011/030623 mailed Oct. 9, 2012.

Ginter, Karl L., English version of specification, claims, and abstract for JP 2008-097645 titled "Secure Transaction Management Device and System and Method for Electronic Right Protection", accessed from www.espacenet.com on Dec. 5, 2012. (http://worldwide.espacenet.com/publicationDetails/biblio? CC=JP&NR=2008097645A&KC=A&FT=D&ND=1&date=20080424&DB=EPODOC&locale=en_EP).

Joon Bum, Kim, English version of abstract for KR 20090079116 titled "Method of Managing Content Data Playing and System Thereof", accessed from www.espacenet.com on Dec. 5, 2012. (http://worldwide.espacenet.com/publicationDetails/biblio?DB=EPODOC&II=1&ND=3&adjacent=true&locale=en_EP&FT=D&date=  20090721&CC=KR&NR=20090079116A&KC=A).

Office Action received for Japanese Patent Application No. 2011-083339, mailed on Jul. 16, 2013, 4 pages of Office Action Including 2 pages of English Translation.

Office Action received for Japanese Patent Application No. 2011-083339, mailed on Dec. 4, 2012, 1 page of English Translation and 2 pages of Japanese Office Action.

Office Action received for Chinese Patent Application No. 201110137572.0, mailed on May 23, 2014, 11 pages of Office Action including 7 pages of English Translation.

Office Action received for Japanese Patent Application No. 2011-083339, mailed on Feb. 12, 2014, 2 pages of Office Action and 2 pages of English Translation.

Office Action received for Russian Patent Application No. 2012141593, mailed on Feb. 27, 2014, 5 pages of Office Action and 5 pages of English Translation.

Office Action for Japanese Patent Application No. 2013-234939, mailed on Sep. 18, 2014, 3 pages English Translation, 3 pages Office Action.

Office Action for Chinese Patent Application No. 201110137572.0, mailed Jan. 9, 2015, 5 pages English Translation, 5 pages Office Action.

Non-Final Office Action for U.S. Appl. No. 14/060,135 mailed Jun. 2, 2015, 21 pages.

Non-final Office Action for U.S. Appl. No. 14/060,135 mailed Jun. 2, 2015.

Office Action for Chinese Patent Application 201110137572.0 mailed Aug. 7, 2015. 5 pages Chinese Office Action, 6 pages English Translation.

* cited by examiner

TECHNIQUES FOR MONETIZING ANONYMIZED CONTEXT

BACKGROUND

The rapid development of wireless devices and their ever-improving mobile capabilities have enabled users to depend on them for increasing numbers of applications while the devices can obtain a wide variety of personal information. Users of such devices are increasingly able to capture contextual information about their environment, their interactions, and themselves on various platforms. These platforms include, but are not limited to, mobile computing/communication devices (e.g., PDAs, phones, MIDs), fixed and portable computing devices (laptops, desktops, and set-top-boxes), and cloud computing services and platforms. Both raw context and profiles derived from this context have a potentially high value to the user, if the user can properly manage and share this information with service providers. Service providers may use this information to better tailor offers to the user, to better understand their customers, or to repackage and sell (or otherwise monetize).

The user potentially stands to benefit through a better service experience or through a specific incentive. The user's ability to leverage this context is currently limited in the following ways: there is no automated way to share, combine, or integrate context across platforms owned by the same user; there is no automated and/or standardized way for the user to share this context with service providers, with or without compensation; and there is no simple mechanism for controlling access to context.

Currently this type of information may be collected and monetized in a variety of ways:

- Context is collected by cloud service providers, via web logs, credit card traces, and other artifacts of day-to-day life. Such context might identify life events or in-market interests. The user often has no knowledge or control over this information and gains nothing in its use.
- Context is collected automatically on the user's platforms and delivered back to a service provider. For example, set-top boxes often collect information about TV viewing patterns, and cell phones often track location.
- Users may explicitly share context by filling out a survey about their interests, demographics, or personal history.

In the above examples, users are not always aware their context is being collected. They may or may not be given the opportunity to opt-out and in most cases, the user will receive no compensation for their context. Also, users do not have a way to allow the gathering of their information anonymously. Thus, a strong need is present for techniques for anonymized monetizing of context information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As mentioned above, users are increasingly capable of capturing contextual information about their environment, their interactions, and themselves on various platforms. These platforms may include, but are not limited to, mobile computing/communication devices (e.g., PDAs, phones, MIDs), fixed and portable computing devices (laptops, desktops, and set-top-boxes), and cloud computing services and platforms. Both raw context and profiles derived from this context have a potentially high value to the user, if the user can properly manage and share this information with service providers. Further, embodiments of systems of the present invention may provide a platform that is an information assimilation and communication platform.

Although several context collection mechanisms are in current use today, none provide all of the following features (1) automatic context collection, (2) user control, (3) user compensation, and (4) data privacy via anonymization.

Although existing mechanisms allow context collected on the user's personal platforms to be controlled by the user and monetized, this capability does not provide anonymization. Some embodiments of the present invention provide for aggregated context and provide anonymization services and a communication protocol that enables a user to choose to monetize aggregated context in a privacy-preserving way. This guarantees both anonymous aggregation of context and compensation to each context contributor.

In this way, users can monetize context collected on the platform, for both accuracy and user control and will be more likely to share context because it is shared in a more anonymous way. Service providers typically only need aggregated data, and can pay less for each individual user's data if it is aggregated and other parties to the transaction may receive recurring revenue by acting as a context aggregation service provider.

Embodiments of the present invention enable users to enter into an agreement with a service provider such that:
  The user contributes some personal context;
  Prior to delivery to the service provider, the context is anonymized by removing identifying information and aggregating it with context from many other users; and
  The user receives appropriate compensation for their contribution.

This may be provided by integrating an anonymization service with a context monetization capability. Looking now at FIG. 1, generally as 100, is provided a high-level message flow for basic monetization of anonymized context of embodiments of the present invention. There are four key parts to embodiments of the present invention.
  The Client 110 delivers context and receives a reward;
  The Anonymization Service 120 knows the identities of the clients but has no access to context or monetary rewards;
  The Service Provider 130 receives anonymized context but cannot attribute it to specific clients. It also arranges for delivery of monetary rewards.
  The Reward Provider 140 generates rewards but has no immediate knowledge of recipients or what they are being compensated for.

Figure 1:
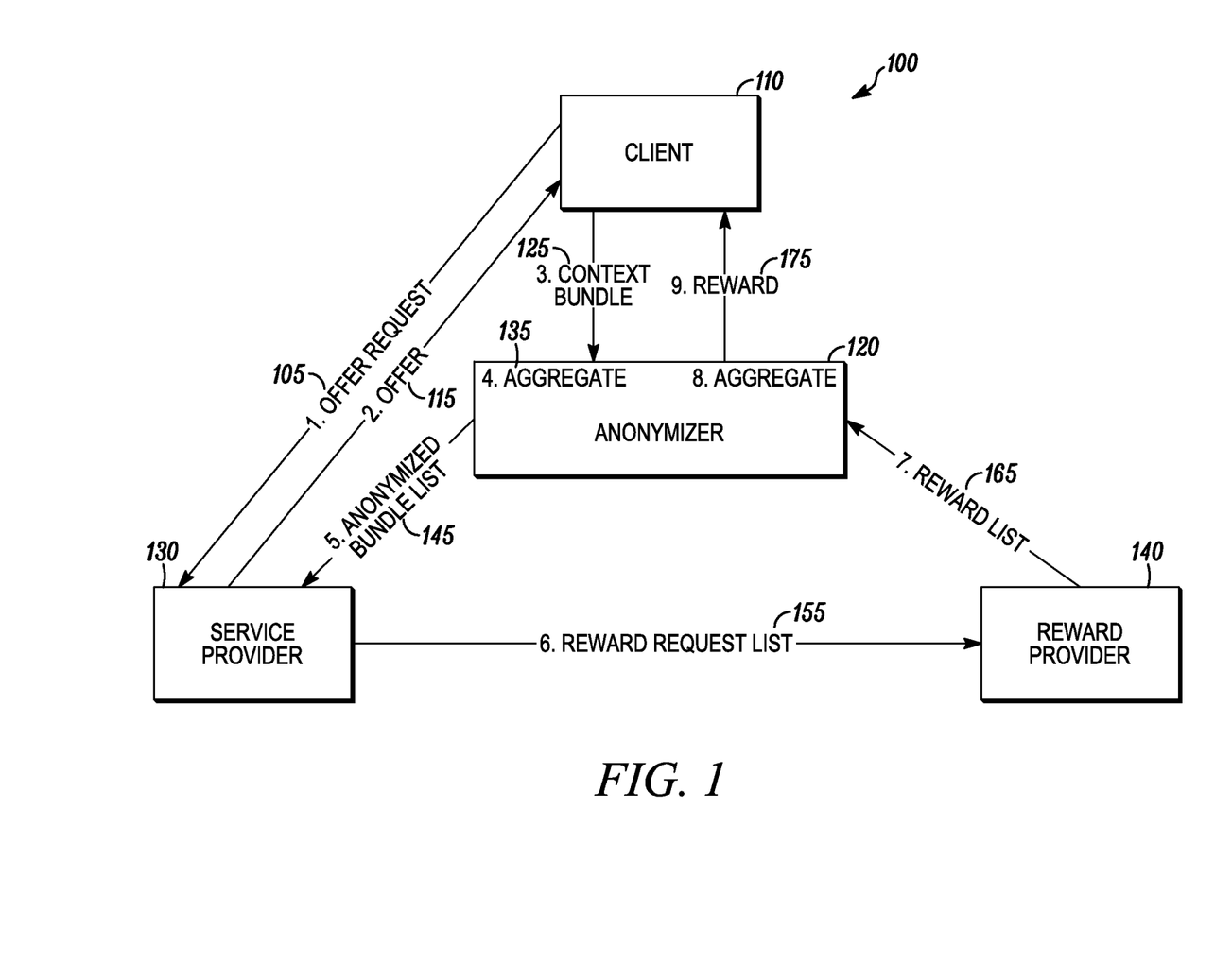
FIG. 1 depicts a high-level message flow for basic monetization of anonymized context according to embodiments of the present invention.

The identity of the client that provided a given piece of context is protected unless two of more of the above participants collude. In an embodiment of the present invention, client 110 may send an offer request 105 to service provider 120 which may return an offer 115 back to client 110. Client may then send at 125 a context bundle to anonymizer 120 which aggregates the client's context with the context of other clients at 135 and sends at 145 to service provider 130. At 155 a reward request list is provided from service provider 130 to reward provider 140, which at 165 sends a reward list to anonymizer 120. At 175 anonymizer 120 sends reward to client 110.

Note that the Anonymization Service represents a recurring revenue opportunity. Such a service can work in conjunction with specific platforms (mobile, PC, set-top, cloud) that generate user context.

Figure 2:
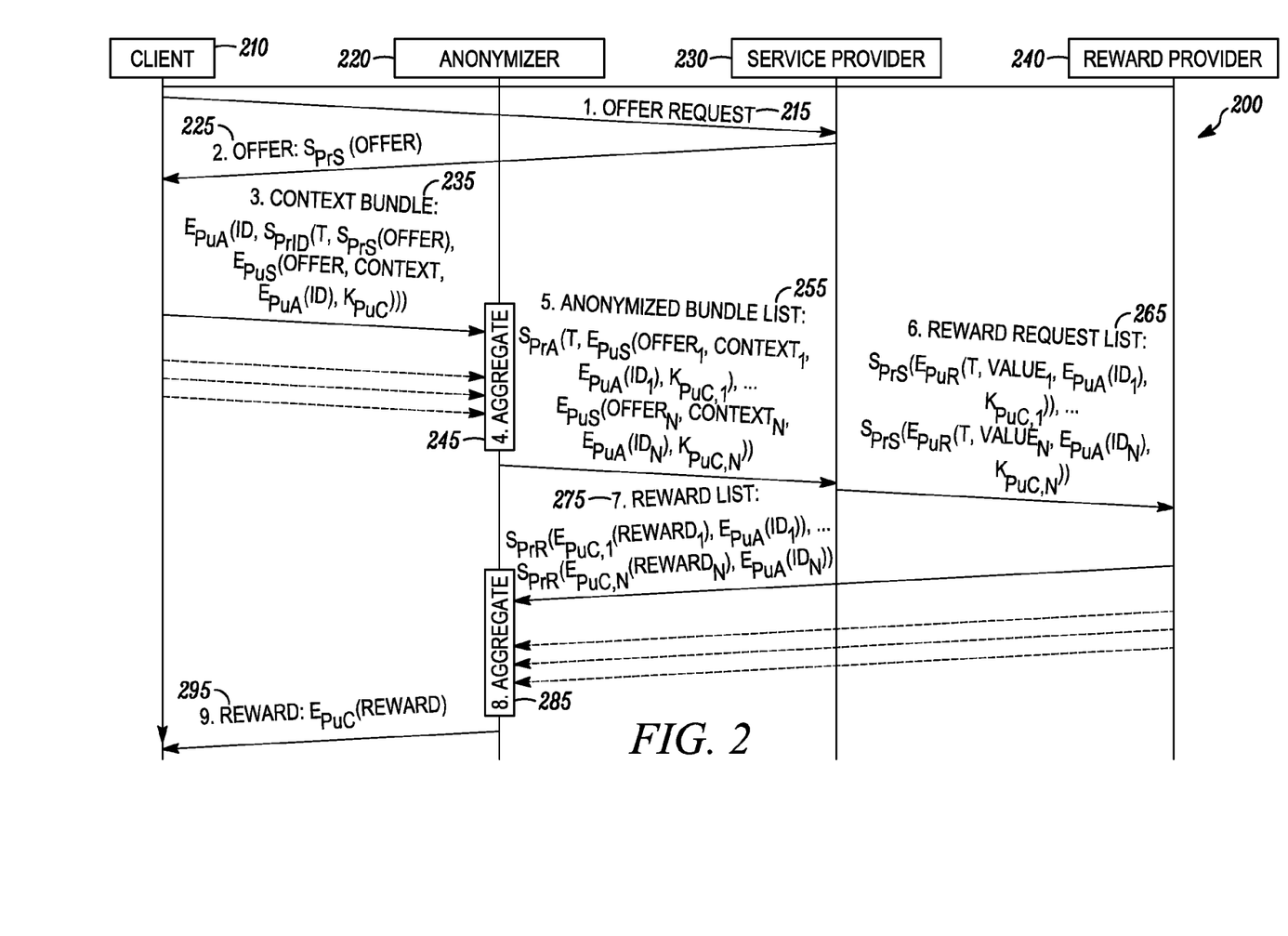
FIG. 2 depicts a detailed communication protocol for basic monetization of anonymized context according to embodiments of the present invention.

The Basic Protocol is shown in FIG. 2, generally as 200, which depicts a detailed communication protocol for basic monetization of anonymized context. The flow chart provides the communication protocol between Client 210, Anonymizer 220, Service provider 230 and Reward Provider 240.

The flow diagrams of the Client, Anonymization Service, Service Provider and Reward Provider algorithms are illustrated in greater detail below. The protocol assumes that an identifier, ID, known only to the client 210 and the Anonymizer 220 has been establish by some means not described here, and that ID is capable of generating message authentication values. The specific embodiment described here assumes that ID is an asymmetric key pair. A step-by-step description of the protocol follows:

Step 1: Offer Request 215: The client asks the Service Provider for a list of available offers. The user's identity is known at this point; however, no context is promised or delivered. Optionally, this request could be forwarded through the Anonymizer. Upon receipt, the Service Provider selects a set of offers to deliver to the Client. These offers may be filtered based on client identity or past client relationships, but they should not be unique to the specific client.

Step 2: Offer 225: One or more offers are returned. Each offer specifies:
  The set of desired context;
  The level of aggregation (over how many users) that this data will receive before delivery;
  The form and amount of compensation;
  An offer may be signed using the private key of the Service Provider, for authenticity. Upon receipt of an offer, the Client chooses whether to participate. Selection of an offer may utilize a user interaction or a previously formulated user-defined policy.

Step 3 235: Context Bundle: To accept an offer, the Client sends the context bundle to the Anonymizer to be aggregated with the context of other users. This message is protected from tampering by signing with a private key tied to the client's ID, and accessible only by the Anonymizer, since it is encrypted with the anonymizer's public key. The message contains:
  The identity of the client;
  A timestamp (real or virtual) for freshness;
  A copy of the original offer, still signed for authenticity;
  A "context package" for the service provider, encrypted using the public key of the service provider (for privacy), containing:
    The original offer;
    The context requested in the offer;
    An obscured form of the node's identity (encrypted using the public key of the anonymizer); and
    A public key owned by the client that will be used to encrypt rewards data for delivery to the client. Note that for maximum privacy protection this should be a one-time use key to prevent correlation over time by the Service Provider and Rewards Provider.

Upon receipt, the Anonymizer unpacks the message. If the data is stale or inauthentic, it is discarded, otherwise, it is stored for later forwarding. Note that the offer specifies the number of users over which to aggregate the data before it is forwarded.

Step 4 245: Aggregation: Once context is collected from the required number of users for a given offer, the "context packages" are assembled in random order into an Anonymized Bundle List. Transmission of the Anonymized Bundle List could be randomly delayed to further protect the identities of the set of Clients whose data are contained in the bundle.

Alternatively, an Anonymized Bundle List can be sent to a given Service Provider at regular intervals. The subset and order of Client data included in a given Anonymized Bundle List would be determined randomly, with a random distribution weighted such that older data is more likely to be included (preventing data from becoming too stale). In this case, no Anonymized Bundle List should be sent to a Service Provider unless a sufficiently large number of entries are available.

In either case, the Anonymized Bundle List can include context packages from multiple offers (since each is labeled with the specific offer). If context packages for multiple offers are included in an Anonymized Bundle List, it is important that the aggregation constraints of each individual offer are satisfied.

Step 5 255: Anonymized Bundle List: The Anonymized Bundle List is sent from the Anonymizer to the Service Provider. It is signed using the Anonymizer's private key, for authenticity. Although not limited in this respect, it may include a timestamp (either real or virtual) for freshness, and a list of "context packages" in random order.

Upon receipt, the Service Provider unpacks the message, checking for authenticity and freshness. It then unpacks each "context package." For each one, it takes the following steps:
  Validates the offer;
  Saves the context for further processing (application specific);
  Formulates a Reward Request using the obscured node identity and public key; and
  All of the above reward requests are combined into a Reward Request List.

Step 6 265: The Reward Request List: The Reward Request List is sent from the Service Provider to the Reward Provider and contains a list of Reward Requests. Although the present invention is not limited in this respect, each Reward Request or the Reward Request List as a whole may be protected by signing with the Service Provider's private key (for authenticity) and encrypting with the Reward Provider's public key (for secrecy). Each reward request may contain:
  A timestamp for freshness;
  The value (and perhaps type) of the requested reward;
  The obscured identity of the recipient; and
  The public key provided by the recipient.

Upon receipt, the Reward Provider prepares a Reward List with one entry for each Reward Request.

Step 7 275: The Reward List: The Reward List is sent from the Reward Provider to the Anonymizer. It contains a list of Reward Messages. Each Reward Message or the Reward List as a whole may be signed using the Reward Provider's private key for authenticity and encrypted with the Anonymizer's public key for privacy. Each Reward Message in the Reward List contains:
  The reward, which may be an electronic certificate (application specific) with some value. It can be unique, but it is not linked to a specific user (the user is not known to the reward provider at this time). For example, the reward might be a code for an Itunes gift card or an Amazon gift certificate. In an embodiment of the present invention, the reward may be encrypted (for privacy) with the public key provided by the intended recipient.

It is noted that the obscured identity of the recipient and the public key provided by the recipient are obtained from the reward request and were originally provided by the client in the Context Bundle.

It may also be noted that while the Reward Provider may eventually (when the reward is redeemed) know the identity of the recipient (the Client), the Reward Provider never knows anything about the offer or the context delivered in response to that offer.

Upon receipt, in embodiments of the present invention, the Anonymizer validates the authenticity of each Reward Message. It can now decrypt the identity of the client node and caches each reward for later delivery.

Step 8: Aggregation 285: The Anonymizer caches each reward for a random amount of time to prevent correlation across rewards. Aggregation is accomplished in a manner similar to that set forth above relating to step 4.

Step 9 295: Reward: Each reward is then addressed to the specific recipient in a Reward message. It may contain the reward, still encrypted using the public key provided by the client for secrecy. Optionally, the reward could be signed by the Reward Provider for authenticity.

Note that one of two properties must hold: (1) the reward is generic (a single code given to all users), or (2) the Reward Provider must be independent of the Service Provider. Validation of these properties is the responsibility of the Client, though the Anonymizer could provide a service that assists Clients in determining the trustworthiness of rewards. Property (1) is difficult to validate and should be considered highly suspect.

Offer Constraints. As noted in Step 1 of the basic protocol, unique properties in an offer or offer signature could enable a bundle to be traced by the Service Provider back to the Client. To reduce this risk, the Anonymizer may choose to enforce some or all of the following rules during processing of bundles in Step 3:
  All responses being anonymized in satisfaction of a given offer must contain an identical copy of the offer and signature.
  All offers may follow a generic format that contains four fields: the context being requested, the level of aggregation, the amount of compensation, and the type of compensation. Each field would be restricted to a small set of fixed values.
  Valid offers (including their signature) must be registered in advance with the Anonymizer. The Anonymizer could then choose to track (and perhaps limit) the number of different offers currently valid for a given Service Provider.

Bundles containing offers that do not meet the desired set of criteria would be rejected. The Anonymizer may also choose to constrain offers to protect clients. For example, the Anonymizer could enforce a minimum level of aggregation or a minimum level of compensation required for release of a particular piece of context.

In some cases, the Anonymizer may not trust the Service Provider to deliver a reward to the recipient. In this case, prior to Step 5, the Anonymizer may signal the availability of the Anonymized Bundle List by sending a list of client public keys and obscured client identities to the Service Provider. The Service Provider can then follow Step 6, resulting in rewards being sent to the Anonymizer in Step 7. Once the Anonymizer has validated receipt of the rewards, the Anonymized Bundle List can be sent to the Service Provider. The choice between this version of the protocol and the basic protocol depends on the relative trustworthiness of the Anonymizer and the Service Provider. However, in general, the basic protocol is sufficient, because the Anonymizer can determine that a given Service Provider is not trustworthy, if rewards are not eventually received.

Figure 7:
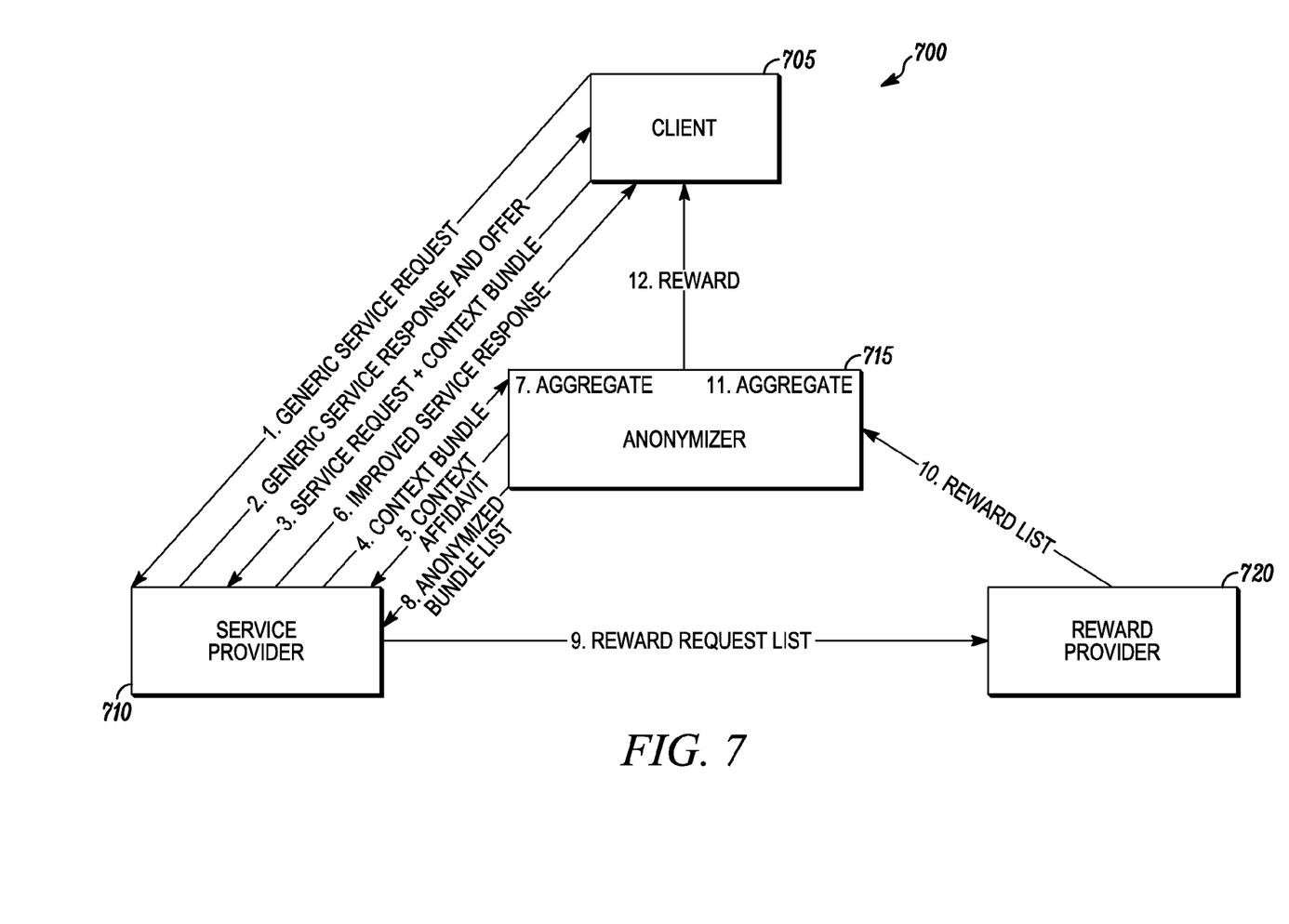
FIG. 7 is a high-level message flow for monetization of anonymized context in conjunction with service delivery according to embodiments of the present invention.
Figure 8:
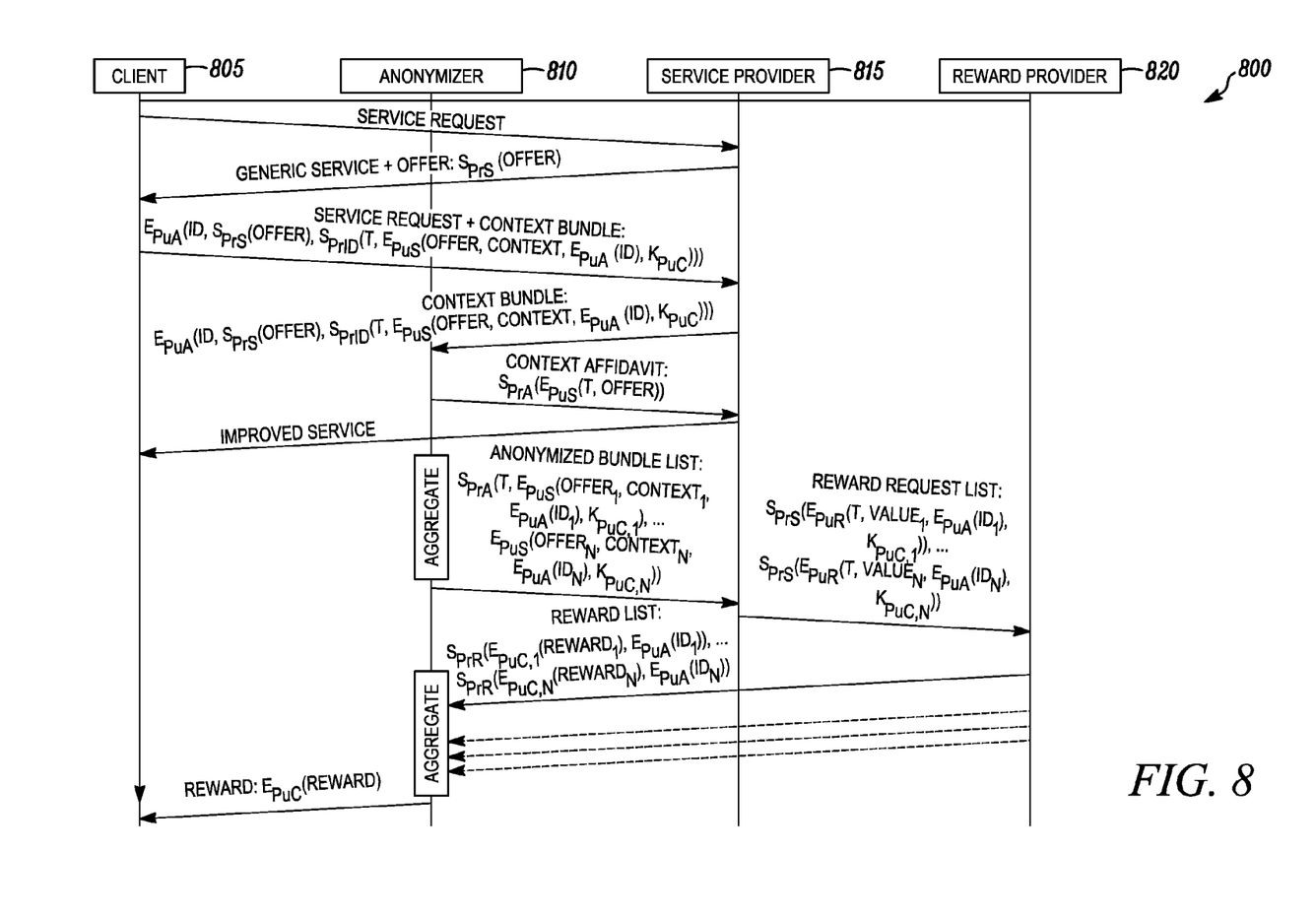
FIG. 8 is a detailed communication protocol for monetization of anonymized context in conjunction with service delivery.

In some cases, users may wish to deliver context as part of the regular service delivery process. For example, the user may wish to utilize a video streaming web site, and deliver a list of their top 10 most frequently watched TV shows in exchange for some free content. To reduce the need to modify existing services and client software, embodiments of the present invention may integrate the anonymous context monetization capability with a typical service delivery mechanism. The resulting protocol is shown in FIGS. 7 and 8 as described below.

The resulting protocol utilizes the same core interactions between Anonymizer, Service Provider, and Reward Provider. For backward compatibility with existing services, the client contacts the Service Provider directly. The protocol proceeds with the following steps:

1. The Client makes a generic service request to the Service Provider.

2. The Service Provider makes a generic service reply (e.g., a content page that does not include any additional free content) to the client, but adds to the response an offer (similar to Step 2 in the basic protocol).

3. If the Client wishes to share some context, it sends a second service request to the Service Provider. This request includes a context bundle (similar to Step 3 in the basic protocol, but sent directly to the Service Provider).

4. The Service Provider cannot access the bundle. Instead, it sends the bundle to the Anonymizer.

5. The Anonymizer validates the bundle, caches it in the anonymization cache, and sends a context affidavit to the Service Provider attesting to receipt of the requested context. The Service Provider won't receive the context until later in the process, once it has been anonymized.

6. The Service Provider can now send an improved service reply to the Client (e.g., with the promised free content). This reply could provide the improved service itself, or a token that the Client can use to unlock an improved service, for either a limited or unlimited period of time.

7. At this point, the protocol proceeds with the basic protocol, starting at Step 4, aggregating data, and eventually sending anonymized context data to the Service Provider and delivering the resulting rewards.

The above procedure results in almost the same anonymization as the basic protocol, except that the Service Provider knows which clients contributed context. However, it still doesn't know which context each Client contributed. As a result, Clients of this version of the protocol will probably want to limit their participation to offers with a higher aggregation factor than the basic protocol.

The above protocol provides a good way for the user to receive preferred service, including delivery of a token that entitles the holder to preferred service. An alternative is to provide the token as the Reward in the Basic Protocol. However, in this case, the Service Provider is also acting as the Reward Provider, which violates an assumption that the Rewards Provider and the Service Provider do not collude. There is a danger that a redeemed token could be used by the Service Provider (who in the case is also the Reward Provider) to connect the Client with their anonymized context. The protocol above provides an alternative approach that does not have this disadvantage.

Figure 3:
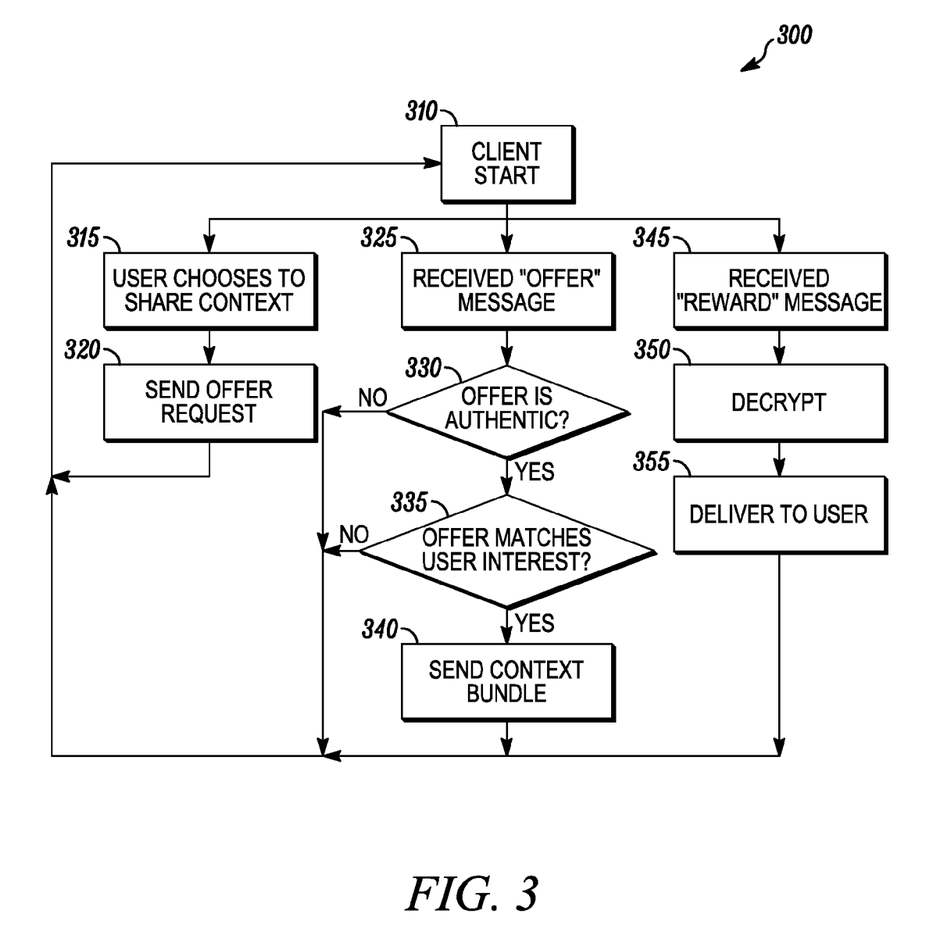
FIG. 3 shows a flow chart of client operation for basic monetization of anonymized context according to embodiments of the present invention.

Continuing with the figures, FIG. 3 shown generally as 300 shows a flow chart of Client operation for basic monetization of anonymized context according to embodiments of the present invention. At 310 Client starts and at 315 user chooses to share context and at 320 sends offer request to the Service Provider. At 325 the Client has received an "offer" message from the Service Provider and a determination is made at 330 if offer is authentic. If NO return to client start. If YES at 335 determine if offer matches user interest. If NO return to Client start. If YES, at 340 the Client sends a context bundle to the Anonymizer and returns to start. At 345 the Client has received a "reward" message from the Anonymizer, at 350 decrypts and at 355 delivers to user and return to Client start.

Figure 4:
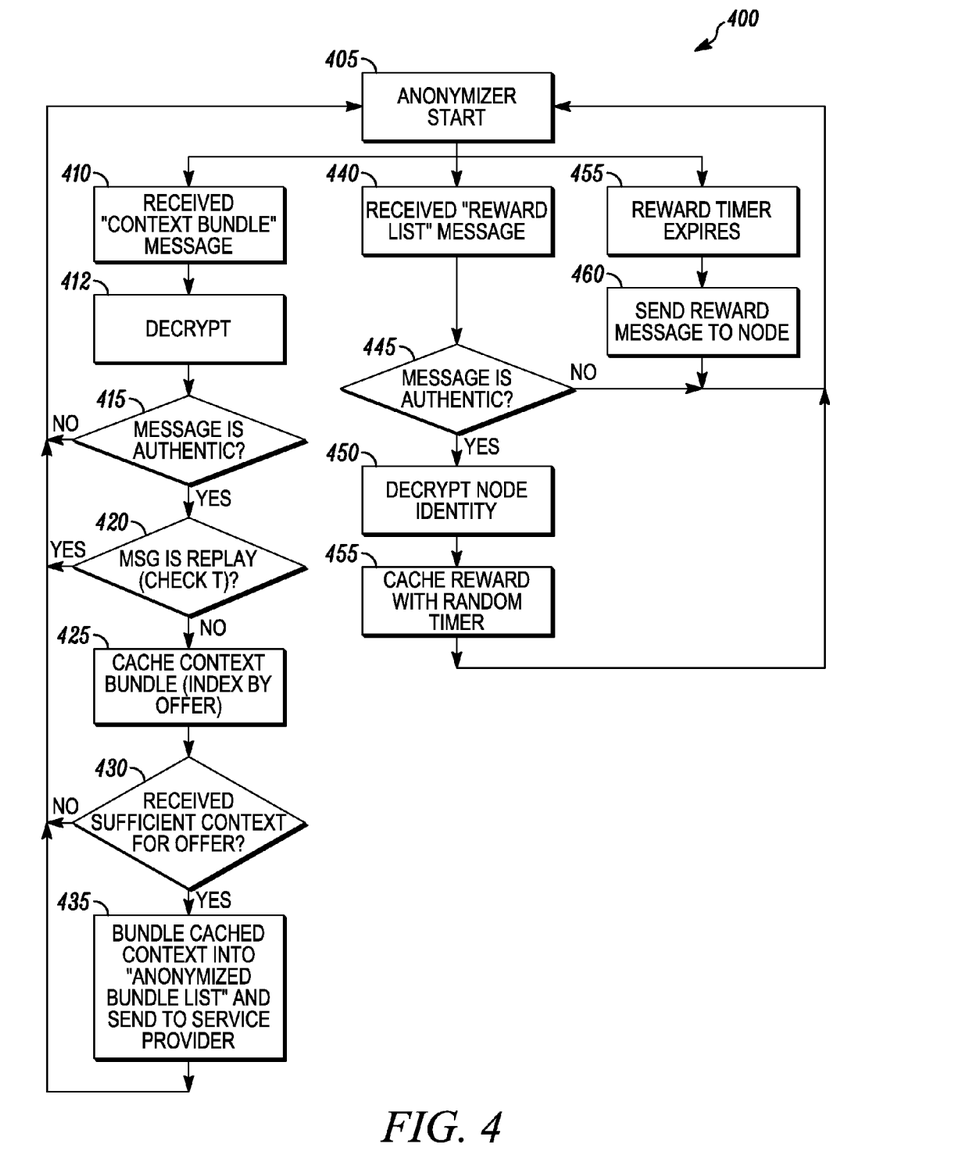
FIG. 4 depicts a flow chart of anonymizer operation for basic monetization of anonymized context according to embodiments of the present invention.

FIG. 4 at 400 depicts a flow chart of Anonymizer operation for basic monetization of anonymized context according to embodiments of the present invention. After Anonymizer start at 405, if received "context bundle" message at 410, decrypt at 410 and determine if message is authentic at 415. If NO, return to Anonymizer start 405. If YES determine if message is replay at 420. If YES, return to Anonymizer start 405. If NO, cache context bundle at 425 and at 430 determine if received sufficient context for offer. If NO, return to Anonymizer start 405. If YES, bundle cached context into "anonymized bundle list" and sent to Service Provider at 435. Then return to Anonymizer start 405.

When received "reward list" message at 440, determine if message is authentic at 445. If YES, decrypt node identity at 450, cache reward and set random timer 455 and return to Anonymizer 405. If reward timer expires at 455, send reward messages to Client nodes at 460 and then return to Anonymizer start 405.

Figure 5:
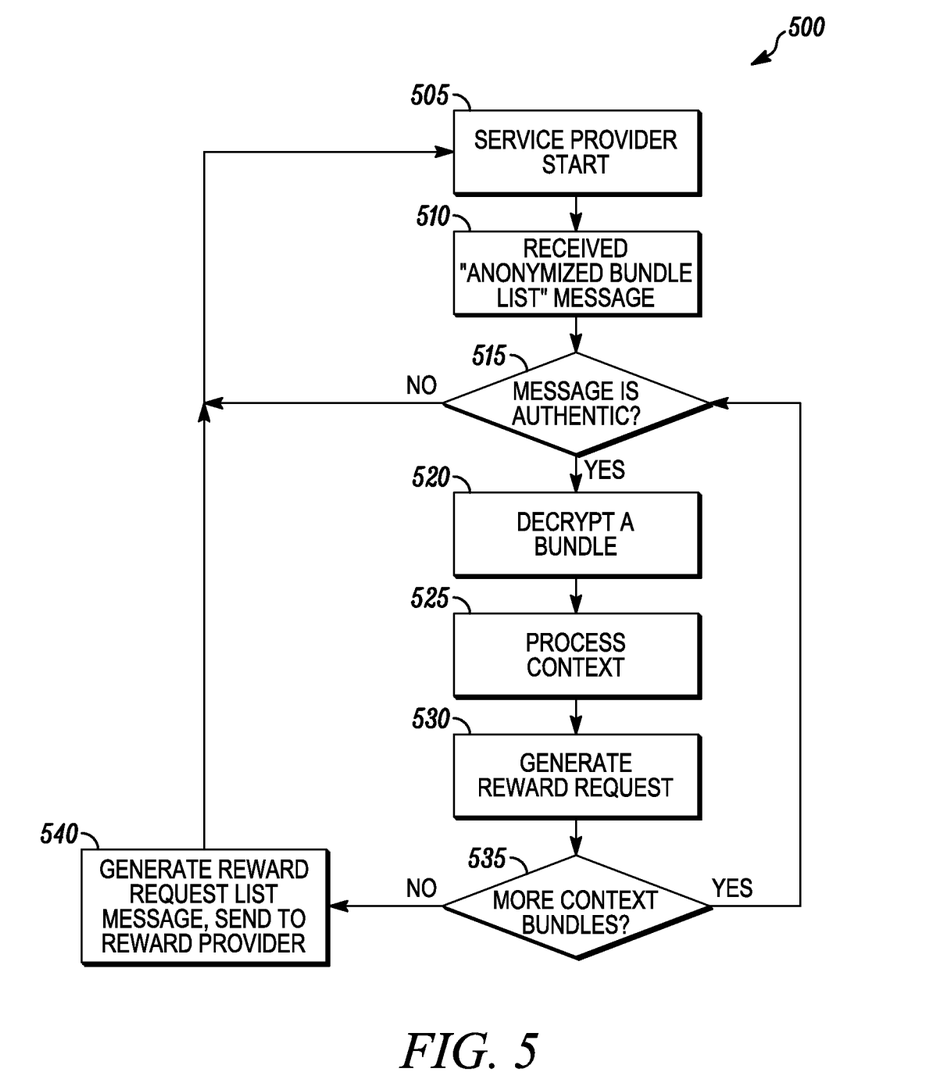
FIG. 5 depicts a flow chart of service provider operation for basic monetization of anonymized context according to embodiments of the present invention.

FIG. 5 at 500 depicts a flow chart of service provider operation for basic monetization of anonymized context according to embodiments of the present invention. Service Provider start is shown at 505 with received "anonymized bundle list" message shown next at 510. Then a determination is made at 515 if message is authentic and if NO return to service provider start 505. If YES, the decrypt a bundle at 520, process context 525 generate reward request at 530 and determine if more context bundles at 535. If YES, return to step 515 and if NO, generate reward request list message and send to Reward Provider at 540.

Figure 6:
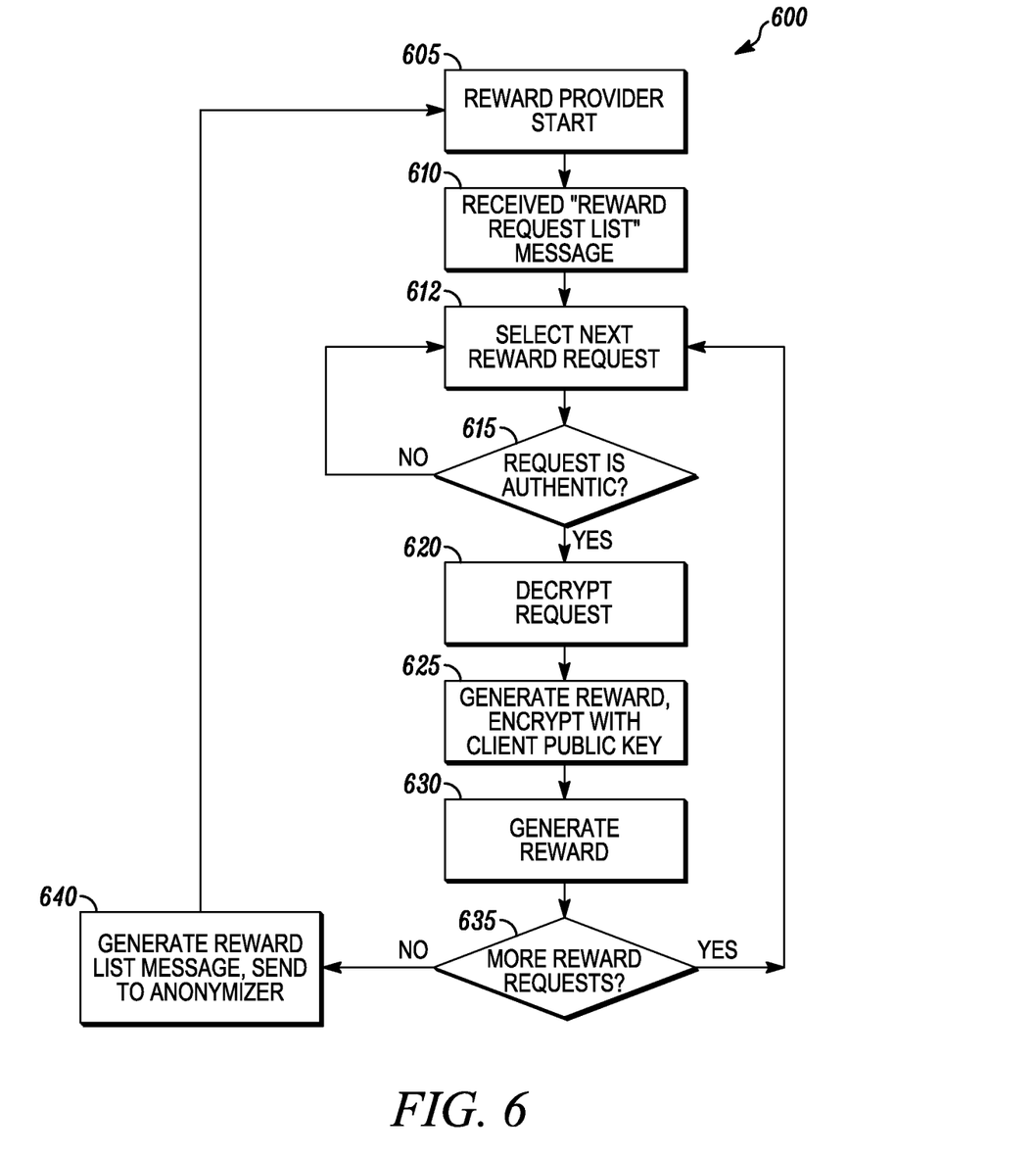
FIG. 6 shows a flow chart of reward provider operation for basic monetization of anonymized context according to embodiments of the present invention.

FIG. 6 at 600 shows a flow chart of Reward Provider operation for basic monetization of anonymized context according to embodiments of the present invention. Reward Provider start is shown at 605 with received "reward request list" message shown next at 610. At 612 select next reward request and then determine at 615 if message is authentic and if NO return to 612. If YES, the decrypt request at 620, generate reward encrypted with public key provided by the Client at 625 generate reward at 630 and determine if more reward requests at 635. If YES, return to step 612 and if NO, generate reward list message and send to Anonymizer 640.

FIG. 7 at 700 is a high-level message flow for monetization of anonymized context in conjunction with service delivery according to embodiments of the present invention. It illustrates message flow between Client 705, Service Provider 710, Anonymizer 715 and Reward Provider 720. Messages may include the following messages between Service Provider 710 and Client 705: 1) generic service request; 2) generic service response+offer; 3) service request+context bundle; 6) improved service response. Message may further include the following messages between Service Provider 710 and Anonymizer 715: 4) context bundle; 5) context affidavit; 8) anonymized bundle list. Reward Provider 720 may communicate 10) reward list to Anonymizer and receive a reward request list 9) from Service Provider 710.

FIG. 8 at 800 is a detailed communication protocol for monetization of anonymized context in conjunction with service delivery. It illustrates protocol flow between Client 805, Anonymizer 810, Service Provider 815 and Reward Provider 820.

Some embodiments of the present invention may further provide a computer readable medium encoded with computer executable instructions, which when accessed, cause a machine to perform operations comprising offering anonymous incentive based context to service providers by delivering context information of a user to the service provider, wherein prior to delivery of the context information to the service provider, the context is anonymized by removing identifying information and aggregating it with context from additional users.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of offering anonymous incentive based context to service providers, comprising:
 anonimizing, by an anonymizer computer of a computer system comprising one or more computers, context information of a user by removing identifying information and aggregating said context information with context from other users;
 delivering, by an anonymizer computer, context information of the user to a service provider computer of the computer system;
 delivering, by said anonymizer computer, an offer request for a list of available offers from said service provider computer;
 receiving, by the anonymizer computer, at least one offer from said service provider computer in response to said offer request;
 receiving, by a client computer of the computer system, a user choice to participate in said at least one offer and in response to the user choice, delivering a context bundle to the anonymizer computer in one of the following manners:
  sending the context bundle from said user to said anonymizer computer to be aggregated with the context of other users; or
  sending the context bundle from said client computer to said service provider computer, wherein context is initially provided to the service provider computer in an obscured form as part of a service request, said service provider computer then forwards said obscured context to said anonymizer computer, said anonymizer computer attests to said service provider computer that said context has been received, and said service provider computer provides an improved service response to the client;
 removing, by the anonymizer computer, identifying information after receiving said context bundle;
 assembling, by the anonymizer computer, context information packages in random order into an anonymized bundle list after context information is collected from a required number of users for a given offer;
 delivering, by the anonymizer computer, the context information packages in the anonymized bundle list to the service provider computer;
 unpacking each context information package by said service provider computer;
 combining, by the service provider computer, reward requests into a reward request list containing a list of reward requests;
 delivering, by said service provider computer, the reward request list to a reward provider computer of the computer system;
 delivering, by said reward provider computer, the reward request list to said anonymizer computer;
 caching, by the anonymizer computer, each reward for a random amount of time to prevent correlation across rewards; and
 addressing, by the anonymizer computer, each reward to a specific recipient in a reward message.

2. The method of claim 1, further comprising said user receiving compensation for the user's contribution of the context information.

3. The method of claim 2, wherein the anonymizer computer is configured to know the identities of users but has no access to context information or monetary rewards, and wherein said service provider computer receives said anonymized context information but cannot attribute said anonymized context information to a specific user, the method further comprising:
 optionally arranging, by the service provider computer, for said compensation, and
 generating rewards by the reward provider computer, wherein the reward provider computer has no knowledge of reward recipients at a time said rewards are generated.

4. The method of claim 1, further comprising enforcing at least one rule during processing of context bundles from the rules group consisting of:
 all context bundles in satisfaction of a given offer contain an identical copy of the offer and a signature;
 all offers follow a generic format that contains four fields: a context being requested, a level of aggregation, an amount of compensation, and a type of compensation;
 valid offers are registered in advance with said anonymizer computer; and
 context bundles responsive to offers that do not meet a desired set of criteria are rejected.

5. The method of claim 1, further comprising signing each offer using a private key of said service provider computer for authenticity, wherein each offer specifies:
 a set of desired context;
 a level of aggregation that the context bundle is configured to receive before delivery; and
 a form and amount of compensation.

6. The method of claim 5, further comprising protecting from tampering by signing, by the client computer, the context bundle delivered in response to the user choice with a private key tied to the client computer's identity, and accessible only by said anonymizer computer as a result of encryption of said context bundle using a public key of said anonymizer computer and wherein said context bundle contains: the client computer's identity, a real or virtual timestamp for freshness; a copy of an original offer signed by the service provider computer; a context information package for said service provider computer, encrypted using a public key of the service provider computer containing said original offer; the context requested in said offer; an obscured form of a node's identity encrypted using the public key of the anonymizer computer; and a public key generated by said client computer.

7. The method of claim 1, further comprising randomly delaying, by the anonymizer computer, delivery of said anonymized bundle list to further protect identities of a set of client computers, data from which are contained in said context bundle.

8. The method of claim 1, further comprising, prior to delivering the context packages in the anonymized bundle list from said anonymizer computer to said service provider computer, signing, by the anonymizer computer, the anonymized bundle list using a private key belonging to the anonymizer computer for authenticity, and wherein the anonymized bundle list includes a timestamp for freshness and a list of context packages in random order.

9. The method of claim 1, further comprising:
upon receipt of said anonymized bundle list by said service provider computer, unpacking, by said service provider computer said anonymized bundle list;
checking for authenticity and freshness by said service provider computer;
unpacking each context information package by said service provider computer; and
performing the following steps by said service provider computer:
- validating the at least one offer;
- saving received context for further processing; and
- formulating a reward request using an obscured node identity and public key.

10. The method of claim 1, further comprising protecting said reward request by signing said reward request with a private key of said service provider computer for authenticity, and encrypting said reward request with a public key of said service provider computer for secrecy, and wherein each reward request contains: a timestamp for freshness; a value of the requested reward; an obscured identity of the client computer that will receive the reward; and a public key provided by such client computer.

11. A system, comprising:
an anonymizer computer configured to:
- offer anonymous incentive based context information via delivery of context information of a user; and
- prior to delivery of said context information, anonymize said context information via removal of identifying information and aggregation of said context information with context from other users;

a service provider computer configured to receive said context and context information;
a client computer configured to:
- communicate an offer request for a list of available offers to said service provider computer,
- receive from said service provider computer a set of offers, and
- upon receipt of a choice from said user to accept an offer of said set of offers, to send a context bundle to said anonymizer computer; and a reward provider computer configured to receive a reward request list sent from said service provider computer;
wherein said anonymizer computer is further configured to:
- aggregate said context information with context of other users and after collection of said context from a required number of the other users for a given offer, assemble context information packages in random order into an anonymized bundle list, and
- send the anonymized bundle list to said service provider computer;

wherein said service provider computer is further configured to:
- prepare a reward request list,
- unpack each context information package received from said anonymizer computer,
- combine reward requests into said reward request list, and send the reward request list; and wherein said anonymizer computer is further configured to:
- receive a reward request list from said reward provider computer, the reward request list containing a list of reward requests, and
- cache each reward for a random amount of time to prevent correlation across rewards, each reward being addressed to a specific recipient in a reward message.

12. The system of claim 11, wherein said anonymizer computer is further configured to know the identities of users but has no access to context information or monetary rewards provided to said users, and wherein said service provider computer is further configured to receive anonymized context information but said service provider computer cannot attribute said anonymized context information to a specific user and arranges for compensation to users, and wherein a reward provider computer is configured to generate rewards but has no knowledge of recipient users at a time said rewards are generated.

* * * * *